United States Patent
Pettegrew et al.

(10) Patent No.: US 9,876,954 B2
(45) Date of Patent: Jan. 23, 2018

(54) CALIBRATING PANORAMIC IMAGING SYSTEM IN MULTIPLE DIMENSIONS

(71) Applicant: IEC Infrared Systems LLC, Middleburg Heights, OH (US)

(72) Inventors: Richard Pettegrew, Cleveland, OH (US); John Paximadis, Cleveland, OH (US)

(73) Assignee: IEC Infrared Systems, LLC, Middleburg Heights, OH (US)

( * ) Notice: Subject to any disclaimer, the term of this patent is extended or adjusted under 35 U.S.C. 154(b) by 156 days.

(21) Appl. No.: 14/865,483

(22) Filed: Sep. 25, 2015

(65) Prior Publication Data

US 2016/0104285 A1   Apr. 14, 2016

Related U.S. Application Data

(60) Provisional application No. 62/062,310, filed on Oct. 10, 2014.

(51) Int. Cl.
| | |
|---|---|
| *H04N 5/232* | (2006.01) |
| *H04N 7/00* | (2011.01) |

(Continued)

(52) U.S. Cl.
CPC ....... *H04N 5/23238* (2013.01); *B64C 39/024* (2013.01); *B64D 47/08* (2013.01);
(Continued)

(58) Field of Classification Search
CPC ........... H04N 13/0246; H04N 5/23248; H04N 7/181; H04N 5/2258; H04N 5/2628;
(Continued)

(56) References Cited

U.S. PATENT DOCUMENTS

2002/0180759 A1* 12/2002 Park ............... G06T 3/0012
345/629
2004/0183679 A1   9/2004 Paximadis
(Continued)

OTHER PUBLICATIONS

U.S. Appl. No. 14/865,621, filed Sep. 25, 2015.
(Continued)

*Primary Examiner* — Dave Czekaj
*Assistant Examiner* — Alison Slater
(74) *Attorney, Agent, or Firm* — Eschweiler & Potashnik, LLC

(57) ABSTRACT

Example apparatus and methods produce image correction data for a lens or sensor based on individual images acquired under different operating parameters. Example apparatus and methods then produce strip correction data based on a strip of images pieced together from the individual images. Example apparatus and methods then produce panoramic image correction data based on a panoramic image pieced together from two or more strips of images. The strip of images is produced without using a hemispherical mirror and thus accounts more accurately for issues associated with making a two dimensional representation of a three dimensional spherical volume. Images are acquired using different imaging parameters (e.g., focal length, pan position, tilt position) under different imaging conditions (e.g., temperature, humidity, atmospheric pressure, pan rate, tilt rate) to account for aberrations that may appear or be exacerbated under operating conditions. Example apparatus and methods then correct images using the correction data.

17 Claims, 12 Drawing Sheets

(51) Int. Cl.

| | |
|---|---|
| *G06K 9/32* | (2006.01) |
| *G01C 11/02* | (2006.01) |
| *G01C 15/00* | (2006.01) |
| *H04N 5/225* | (2006.01) |
| *G06T 3/00* | (2006.01) |
| *H04N 5/265* | (2006.01) |
| *G01C 3/08* | (2006.01) |
| *G01S 7/48* | (2006.01) |
| *G01S 17/42* | (2006.01) |
| *G06T 5/50* | (2006.01) |
| *B64C 39/02* | (2006.01) |
| *B64D 47/08* | (2006.01) |
| *H04N 5/33* | (2006.01) |
| *H04N 7/18* | (2006.01) |
| *G06T 3/40* | (2006.01) |
| *H04N 5/357* | (2011.01) |
| *H04N 17/00* | (2006.01) |
| *G06T 7/80* | (2017.01) |

(52) U.S. Cl.
CPC ............ *G01C 3/08* (2013.01); *G01S 7/4808* (2013.01); *G01S 17/42* (2013.01); *G06T 3/0062* (2013.01); *G06T 3/0093* (2013.01); *G06T 3/4038* (2013.01); *G06T 5/50* (2013.01); *G06T 7/80* (2017.01); *H04N 5/2252* (2013.01); *H04N 5/2254* (2013.01); *H04N 5/2256* (2013.01); *H04N 5/2258* (2013.01); *H04N 5/23216* (2013.01); *H04N 5/23229* (2013.01); *H04N 5/265* (2013.01); *H04N 5/33* (2013.01); *H04N 5/3572* (2013.01); *H04N 7/185* (2013.01); *H04N 17/002* (2013.01); *B64C 2201/127* (2013.01); *B64C 2201/146* (2013.01); *G06T 2207/10032* (2013.01); *G06T 2207/10048* (2013.01); *G06T 2207/20221* (2013.01)

(58) Field of Classification Search
CPC ....... H04N 13/0253; H04N 2013/0081; G03B 37/04; G03B 21/142; G03B 21/147; G03B 21/53; G03B 5/00; G06T 7/80; G06T 7/85; G06T 7/97; G01S 3/023
See application file for complete search history.

(56) References Cited

U.S. PATENT DOCUMENTS

| | | |
|---|---|---|
| 2004/0223062 A1 | 11/2004 | Pettegrew |
| 2005/0024606 A1* | 2/2005 | Li .......................... H04N 5/74 353/121 |
| 2006/0238617 A1 | 10/2006 | Tamir |
| 2007/0228278 A1 | 10/2007 | Paximadis |
| 2007/0237423 A1 | 10/2007 | Tico |
| 2008/0049123 A1 | 2/2008 | Gloudemans |
| 2009/0160936 A1 | 6/2009 | McCormack |
| 2010/0097442 A1* | 4/2010 | Lablans .................. G03B 5/00 348/36 |
| 2010/0141735 A1* | 6/2010 | Yamashita ............. H04N 5/232 348/36 |
| 2011/0157386 A1 | 6/2011 | Ishii |
| 2011/0194851 A1* | 8/2011 | Hjelmstrom ........... G03B 7/095 396/242 |
| 2011/0211040 A1* | 9/2011 | Lindemann ........... G01C 11/02 348/36 |
| 2012/0062695 A1 | 3/2012 | Sakaki |
| 2012/0243746 A1 | 9/2012 | Higashimoto |
| 2013/0229529 A1* | 9/2013 | Lablans ............. H04N 5/23238 348/169 |
| 2014/0226002 A1* | 8/2014 | Metzler ................... G01C 1/04 348/78 |
| 2014/0247323 A1* | 9/2014 | Griffis ................ H04N 5/23238 348/36 |
| 2014/0267775 A1* | 9/2014 | Lablans ................. H04N 5/247 348/169 |
| 2015/0055886 A1 | 2/2015 | Oh et al. |
| 2015/0381968 A1* | 12/2015 | Arora ...................... G06T 17/00 348/47 |
| 2016/0094840 A1* | 3/2016 | Warner ..................... G06T 7/80 348/188 |
| 2016/0104284 A1* | 4/2016 | Maguire .................. G06T 7/80 348/187 |
| 2016/0105649 A1 | 4/2016 | Pettegrew |
| 2016/0125234 A1* | 5/2016 | Ota ........................... G06T 7/20 382/103 |
| 2016/0129283 A1* | 5/2016 | Meir ...................... A61B 6/584 348/46 |
| 2016/0227193 A1* | 8/2016 | Osterwood ............ G01S 17/42 |
| 2017/0018112 A1 | 1/2017 | Vaganov |
| 2017/0163888 A1 | 6/2017 | Norland |

OTHER PUBLICATIONS

U.S. Appl. No. 14/865,799, filed Sep. 25, 2015.
U.S. Appl. No. 14/865,939, filed Sep. 25, 2015.
Notice of Allowance dated Apr. 15, 2016 in connection with U.S. Appl. No. 14/865,799.
Non-Final Office Action dated Aug. 23, 2017 in connection with U.S. Appl. No. 14/865,939.
Non-Final Office Action dated Aug. 10, 2017 in connection with U.S. Appl. No. 14/865,621.

\* cited by examiner

CALIBRATING PANORAMIC IMAGING SYSTEM IN MULTIPLE DIMENSIONS

CROSS-REFERENCE TO RELATED APPLICATIONS

This application claims the benefit of U.S. Provisional Application 62/062,310 filed Oct. 10, 2014.

BACKGROUND

A sub-optimally calibrated imaging system is inconvenient in recreational applications. For example, a photograph from a sub-optimally calibrated system may not faithfully or artistically present the view a vacationer remembers. A sub-optimally calibrated imaging system may be fatal in military or security applications. For example, an image from a sub-optimally calibrated system that is used to activate an alarm or weapons system may lead to catastrophic consequences if ordinance or other measures are delivered inaccurately or inappropriately based on aberrations in the image. Thus, more optimal calibration approaches that facilitate high-speed, high-resolution, wide field of view (FoV) imaging are constantly sought.

A panoramic imaging system may acquire multiple images (e.g., digital photographs) that when processed into a single image provide a larger field of view than is available in a single image. For example, a panoramic imaging system may acquire multiple images that when processed together provide a three hundred and sixty degree view of an area around the imaging system. Conventionally there have been different approaches for acquiring the multiple images that are processed together into a single image that has a larger field of view. One conventional approach to panoramic imaging includes acquiring images from several image acquisition apparatus (e.g., cameras) that are pointed in different directions. Another conventional approach to panoramic imaging includes moving a single image acquisition apparatus to different positions. Regardless of how the multiple images are acquired, the quality of the final image depends on several factors. One factor is the lens through which the individual images are acquired.

Lenses are rarely, if ever, perfect. Lenses frequently have aberrations that reduce the fidelity of an image produced using the lens. Fidelity, as used herein, refers to the degree to which an electronic imaging system accurately reproduces a two dimensional image of a three dimensional scene from which the electronic imaging system receives electromagnetic radiation as an input signal.

Calibrating an imaging system to account for an imperfection in a lens is well known for certain configurations. For example, calibrating an imaging apparatus (e.g., camera) that will capture single images from a single point of view (PoV) using a single field of view (FoV) produces interesting problems whose solutions are well known. However, calibrating an imaging system that will capture multiple images from multiple points of view using multiple fields of view while being relocated from position to position while operating parameters change produces more complicated problems for which conventional systems provide no answers.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
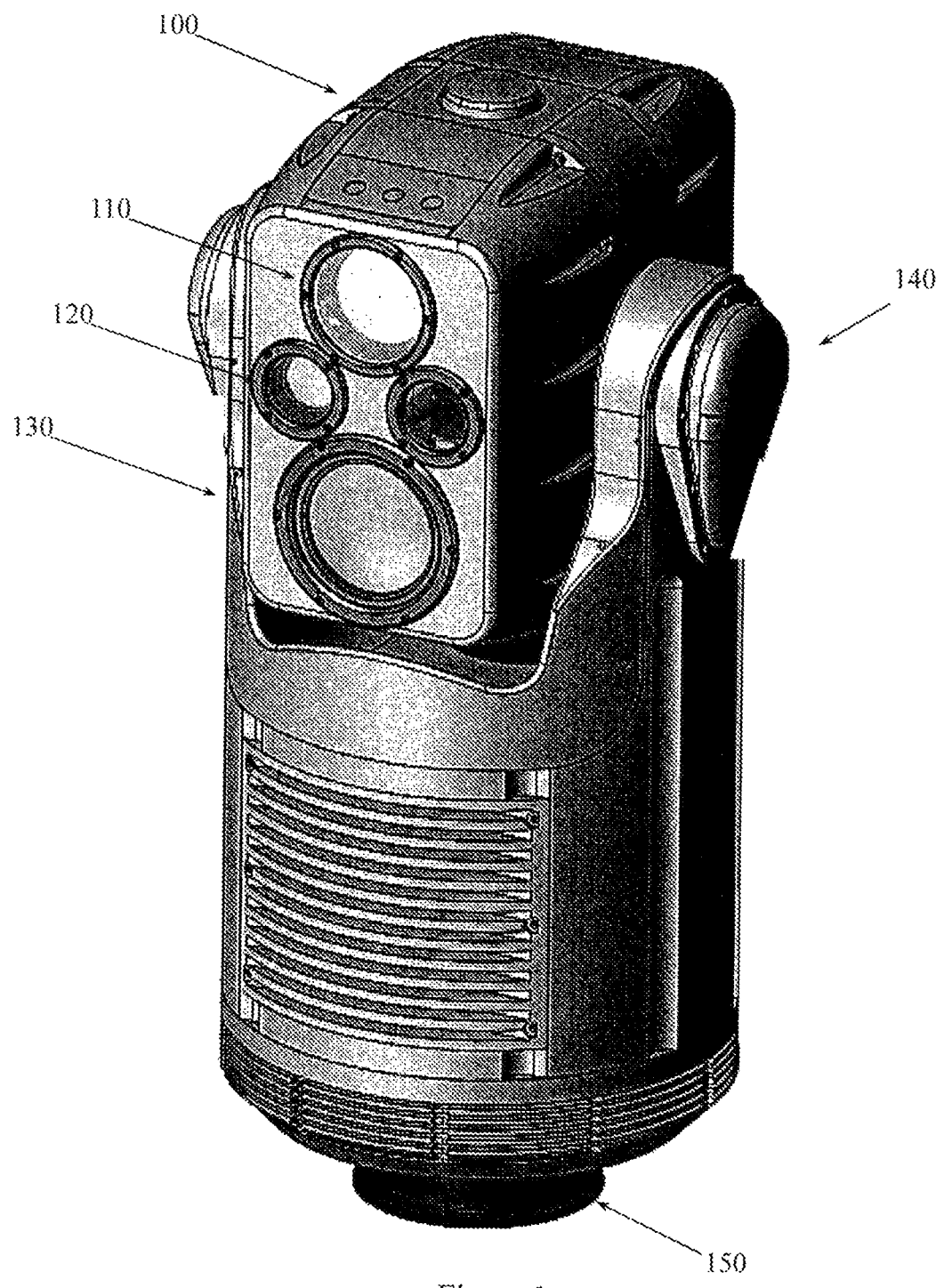
FIG. 1 illustrates an example panoramic imaging system.

Example apparatus and methods facilitate calibrating a panoramic imaging system in multiple dimensions under multiple operating conditions. Example apparatus and methods facilitate calibrating an imaging system that will capture multiple images from multiple points of view using multiple fields of view or multiple zoom levels under different operating conditions while being panned or tilted from position to position at various rates or accelerations. Calibrating the panoramic imaging system facilitates accounting for aberrations in a lens or sensor used to acquire the images. Unlike conventional systems where a lens and sensor may maintain a fixed relationship and may operate under substantially uniform operating conditions, an example system may change a relationship between the lens and sensor and may operate under a wide range of operating conditions. For example, the lens and sensor may be housed in a unit that weighs more than a hundred pounds, that is spinning at sixty revolutions per minute, that is being tilted while spinning, that is simultaneously collecting electromagnetic radiation in multiple spectra, and that is operating in temperature ranges from below 0 F to over 100 F, in humidity ranges from substantially zero percent to substantially one hundred percent, in atmospheric pressure ranges from less than one atmosphere to more than one atmosphere, and in varying light conditions. Calibrating the lens and sensor under this wide variety of operating conditions may reveal aberrations that are not discovered in single point of view static testing.

In one embodiment, calibration may be provided for a panoramic imaging system whose camera(s) pan to provide three hundred and sixty degrees of horizontal coverage and whose camera(s) tilt to provide at least one hundred and eighty degrees of vertical coverage. Thus, calibration may be provided for a panoramic imaging system that acquires images that cover a sphere centered at the location of the imaging system. Additionally, the zoom level or field of view for an image may vary as the camera(s) are panned and tilted to different positions. Additionally, light conditions may be varied as the camera(s) are panned, tilted, zoomed, and otherwise manipulated through the test space.

Unlike conventional systems that may calibrate a camera for a fixed PoV or FoV for a single sensor type (e.g., photographic film, digital imager) based on known or discovered lens properties, example apparatus and methods may calibrate multiple image acquisition assemblies (e.g., lens plus sensor) for a dynamic PoV or FoV based on lens properties, sensor properties, and other properties under varying conditions. Unlike conventional systems that may calibrate a camera for a single spectrum (e.g., visible light) at a single saturation, example apparatus and methods may calibrate a system whose images may be combined with data or imagery from other sensors and for sensors that may experience a wide variety of light conditions. By way of illustration, an example apparatus may acquire images using visible spectra sensors, infrared spectra sensors, ultraviolet spectra sensors, laser range finding sensors, and other sensors. The camera(s) and other sensors may be combined into an apparatus that pans and tilts through ranges that facilitate covering an entire sphere or less than an entire sphere. In one embodiment, the apparatus may rotate through three hundred and sixty degrees acquiring a "line" of images at a first tilt angle and then rotate through three hundred and sixty degrees again acquiring another line of images at a second tilt angle. The first two lines of images may have been acquired with a first zoom level that yielded a first FoV. The apparatus may then rotate through one hundred and eighty degrees acquiring another line of images at a third tilt angle and using a second zoom level that yielded a second FoV. Calibrating the imaging system to account for the horizontal movement, vertical movement, changing zoom levels or fields of view, and changing horizontal coverage produces problems not encountered by conventional calibration systems and reveals aberrations not discovered by conventional systems.

FIG. 1 illustrates an example panoramic imaging system 100. System 100 may include an optical imaging assembly 110, a laser range finding apparatus 120, and a thermal imaging assembly 130. System 100 may be panned using assembly 150 and may be tilted using assembly 140. Different panoramic imaging systems may include different numbers and types of sensors arranged in different configurations.

A conventional system that only has to consider light of a single intensity in the visible spectrum for a single lens that will acquire single images at a single orientation and single zoom level may be calibrated from a single image. Conventional approaches include, for example, displaying a grid on a surface that should produce a known pattern in an acquired image, and then determining parameters for the lens that will correct for imperfections in the lens. Example apparatus that have to consider inputs with multiple intensities from multiple spectra for acquisition apparatus that will acquire multiple images at multiple orientations (pan, tilt), multiple depths of field (range), multiple fields of view, and multiple zoom levels, at different pan and tilt rates and rates of acceleration may not be calibrated so easily. The motion and acceleration of a unit may create or exacerbate aberrations that are not so apparent in a static system.

Conventional panoramic imaging systems may employ a linear array image sensor that acquires just a thin narrow line of image data. This type of conventional linear array image sensing does not produce warping effects for which calibration is necessary. Conventional panoramic imaging systems may acquire image data for a scene having a single depth of field. This type of conventional image sensing does not produce different effects for different ranges to objects for which calibration is necessary. Conventional panoramic imaging systems may acquire data using a single zoom level. This type of conventional image sensing does not produce different effects for different zoom levels for which calibration is necessary. Conventional panoramic imaging systems may acquire data using a single FoV. This type of conventional image sensing does not produce different effects for different fields of view for which calibration is necessary. Conventional panoramic imaging systems may acquire data using a stationary camera. This type of conventional imaging sensing does not produce different blur effects for which calibration is necessary. Thus, example apparatus and methods face challenges that do not exist for conventional stationary or even panoramic systems.

Conventional systems that produce single mode images (e.g., visible light only, IR only) do not face the same calibration issues that systems that produce multi-mode composite images (e.g., visible light and IR). Different sensors may have different correction data that may need to be applied separately to individual sensors and then manipulated for the composite image.

In the field, at startup, an example system may automatically create an initial, static panoramic image at the widest FoV settings available. This image may provide a user with a context that facilitates selecting working parameters for the current deployment. The working parameters may include, for example, a pan limit (e.g., azimuth range), a tilt limit (e.g., elevation range), initial grid resolutions, range of grid resolutions, and other information. The setup parameters may define a grid of angular locations at which images will be acquired in the field. Example apparatus and methods may position the sensors to sample the field at the angular locations. Samples acquired from the field may be used to select image correction parameters from the calibration data.

An image acquisition assembly may include a lens and a sensor. A lens may have a focal length. Example image acquisition assemblies may be able to change the focal length for the assembly to zoom in or zoom out. Changing the zoom may also change the FoV. For example, when zoomed all the way out, the FoV may have a first (e.g., larger) size and when zoomed all the way in may have a second (e.g., smaller) size. The number of pixels excited in a sensor may be the same regardless of the focal length, but the intensity of light acquired at a pixel may vary based on the zoom level or focal length. The amount of space associated with a pixel may also vary based on the zoom level or focal length. For example, the light from a three dimensional volume that is focused onto a single sensor may come from volumes of different sizes. By way of illustration, compare the light acquired from a volume when a camera is looking at a wide open dessert vista at high noon on June 21 in the northern hemisphere to the light acquired when the camera is looking at the side of a building ten feet away at dawn on December 21 in the northern hemisphere. Conventional apparatus may not account for this volume effect. The light acquired at these times may also have a different angle. Conventional systems may not account for this angle. Example apparatus and methods may calibrate for varying zoom levels and focal lengths which may produce volume effects for which calibration is performed.

Calibration in the shop may produce data (e.g., mathematical coefficients) that characterizes the aberrations, if any, in a lens. The calibration may produce information about how a lens actually forms an image as opposed to how the theoretically perfect lens forms an image. Calibration in the shop may also produce data (e.g., mathematical coefficients) that characterizes the aberrations, if any, in a sensor. Calibration in the shop may also produce data (e.g., mathematical coefficients) for the combination of the lens and the sensor system. Calibration in the shop may be performed in isolation where the lens is characterized with a known sensor or where the sensor is characterized with a known lens. Calibration in the shop may also be performed in a production setting where the characterized lens and characterized sensor are mounted in the production unit to discover and remedy any effects that mounting the assembly in the production unit may produce. For example, a lens that receives light in the shop without a filter may perform differently than a lens in the field that receives light through a cover. Like lenses may have aberrations, so too may covers, filters, or other optical components have aberrations. Thus, unlike conventional systems that may only calibrate in isolation in the shop, example apparatus and methods may calibrate in a multi-stage process that will produce superior results.

Example apparatus may have image acquisition assemblies for which the focal length can be changed. Acquiring information about the effective focal length facilitates subsequent image processing (e.g., stitching together individual frames). Example apparatus and methods therefore acquire calibration data that facilitates computing corrections to a field of view in an acquired image. The calibration data may be employed to determine de-warping corrections for an image. Different de-warping corrections may be needed for different images acquired when the image acquisition assembly has different focal lengths.

A conventional lens and sensor assembly may have a single fixed focal length for which precise focal length determinations may be known. Example lens and sensor assemblies may have dynamic focal lengths due to zooming operations. Additionally, environmental factors (e.g., temperature, humidity, air pressure) may affect focal length. During calibration, position encoders may provide approximate focal length values, but small uncertainties may need to be anticipated and addressed. For example, in the field, a sensor may experience dramatic temperature changes during a day. In the high desert, at midday, temperatures may exceed 120 F while at night temperatures may fall below 32 F. Thus, significant thermal expansion or contraction may occur in the lens, the sensor, and the apparatus in which the image acquisition assembly is located. Example apparatus and methods may therefore calibrate under varying temperature, pressure, humidity, or other environmental conditions and a deployed unit may dynamically adapt its correction approach based on sensed conditions. Additionally, operating parameters (e.g., pan rate, pan acceleration rate) may produce mechanical forces that affect focal length or other properties. For example, a system that is spinning clockwise at 60 rpm may produce a first mechanical stress that subtly changes the orientation of the lens and assembly in a first way while a system that is spinning counterclockwise at 30 rpm may produce a second, different mechanical stress that subtly changes the orientation of the lens and assembly in a different way. Example apparatus and methods may account for these aberrations.

Figure 2:
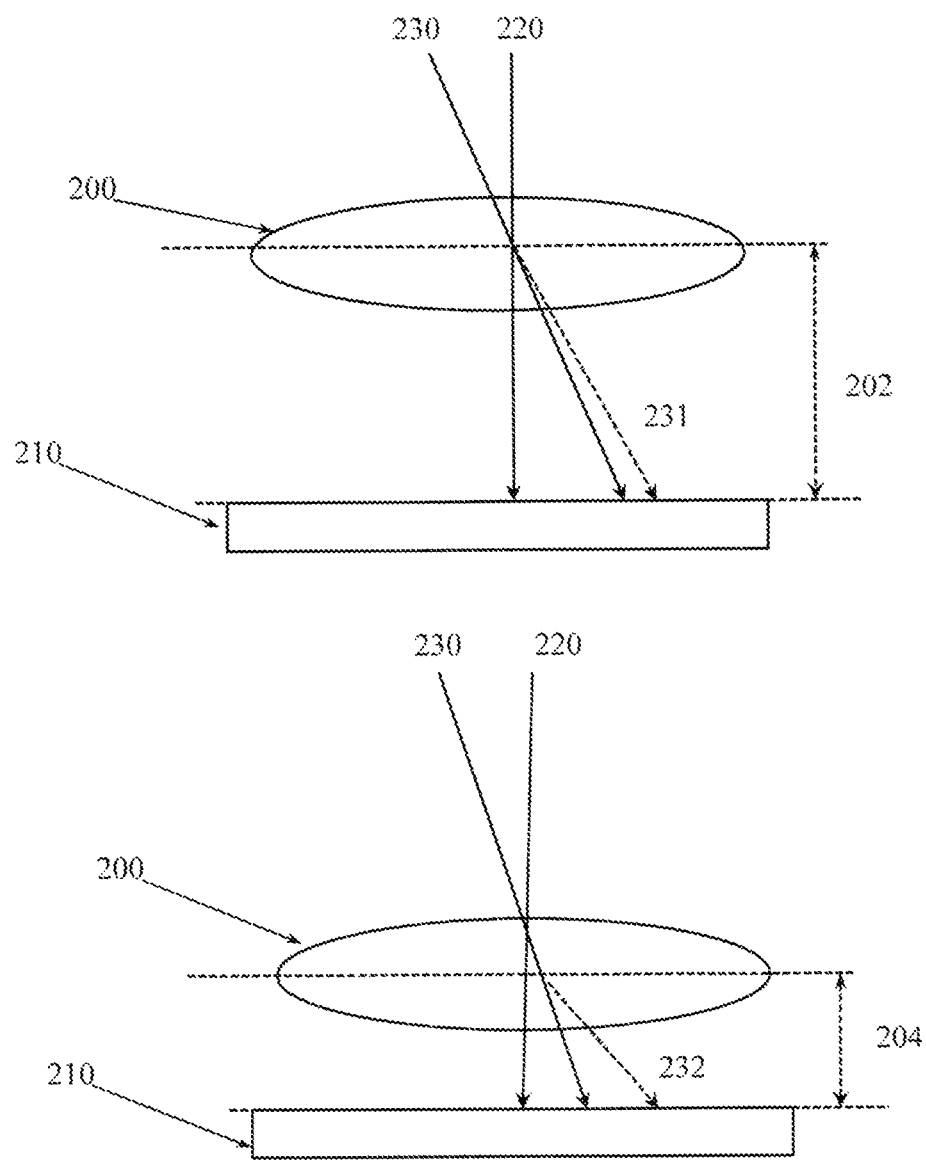
FIG. 2 illustrates an example lens and sensor.

One calibration action involves determining optical distortion caused by aberrations in a lens. Different lens will have different aberrations and thus different optical distortions. FIG. 2 illustrates a lens 200 and an image sensor 210 arranged with different focal lengths 202 and 204. There is an ideal theoretic path along which light arriving on path 220 would arrive at image sensor 210. Similarly, there is an ideal theoretic path along which light arriving on path 230 would arrive at image sensor 210. An actual lens may not exhibit ideal behavior. Thus, while light arriving along path 220 is illustrated arriving at sensor 210 along the ideal theoretic path, light arriving on path 230 is illustrated arriving at sensor 210 along actual paths 231 and 232, neither of which are the ideal theoretic path. Conventional systems may calibrate lens 200 and identify data (e.g., mathematical co-efficients) that can be applied to correct for the aberration that caused light to travel along actual paths 231 and 232 instead of ideal path 230. The mathematical co-efficients may be used in a transform that returns the actual lens to the performance of an ideal lens.

Figure 3:
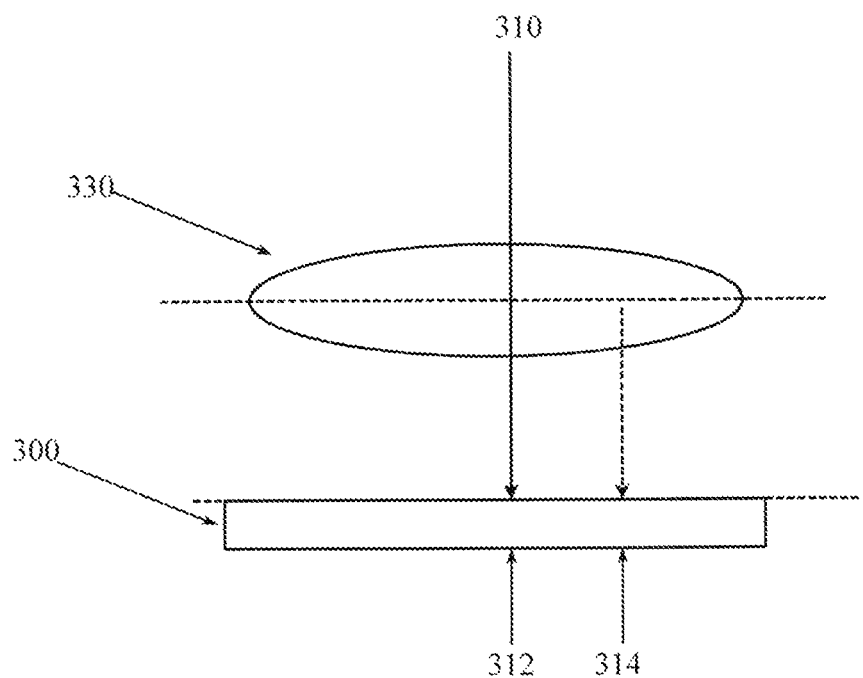
FIG. 3 illustrates an example lens and sensor.

One calibration action involves determining optical distortion caused by aberrations in a sensor. Different sensors will have different aberrations and thus different optical distortions. An aberration in a sensor may result in a sensor reporting that light that should be reported as being at a point A is reported as being at a point a FIG. 3 illustrates an example where a sensor 300 is reporting light 310 as being detected at point 314 instead of point 312 where the light 310 is actually being presented. The light may pass through lens 330 as though lens 330 was an ideal lens and yet sensor 300 may still incorrectly report the location of the detected light.

The aberration in the sensor 300, or an aberration in lens 330 may result from manufacturing, normal wear and tear, or actions that occur in the field. For example, a lens may get scratched or a sensor may overheat or freeze and malfunction under certain conditions. Conventionally, when calibration was performed once and only for a lens, post-manufacturing aberrations may not be addressed.

In some cases, damage may be so severe that recalibration cannot produce correction values that will mitigate the effect of the aberration. It may be impractical to simply turn off the system and wait for a replacement unit. In these cases, the correction values may act to eliminate the data reported as a result of the aberration while allowing other data to be acquired. Rather than return light to where it is supposed to have been detected, correction values may remove the light from the imaging process. This may facilitate keeping the panoramic imaging system in operation. Consider that a panoramic imaging system stitches together multiple images to create the panoramic image. Even if aberrations are too severe to correct, as long as a portion of an image can be acquired with adequate fidelity, multiple partial images may still be stitched together to produce a useful panoramic image. This produces the concrete, tangible, real-world result of improving the operation of a panoramic imaging system under conditions that would cripple a conventional system.

Conventionally, the characterization of a lens and the calibration to find data for transforming an actual lens back to an ideal lens is performed using a fixed pattern synthetic target that is displayed on a flat surface at a single fixed, known distance and orientation from the lens being characterized. A typical synthetic target may be, for example, a grid pattern having a high contrast between the pattern and the background. An ideal lens will image straight lines from the target plane as straight lines in an image plane, though the lines may not be parallel. A deviation from the straight lines identifies an aberration in the lens. Mathematics may be performed to determine how to return the lines from their deviant position to a straight lines configuration.

Figure 8:
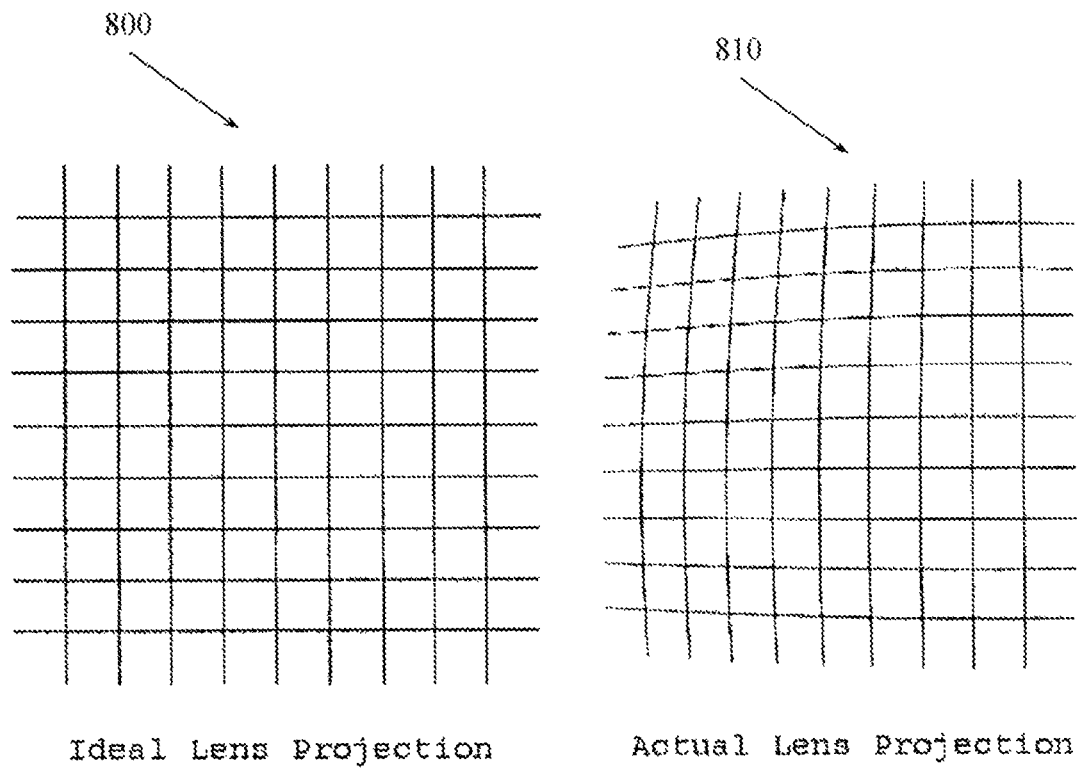
FIG. 8 illustrates an example target pattern and actual lens projection of the target pattern through a lens having aberrations.

FIG. 8 illustrates an example target pattern 800 and actual lens projection 810 of the target pattern 800 through a lens having aberrations. The straight lines in target pattern 800 have not been faithfully produced in the actual lens projection 810. The actual lens projection 810 produces an image with less than perfect fidelity of the target pattern 800. Conventional systems may attempt to account for the results of an aberration in a single dimension under a single set of operating parameters for a static system. Example systems are not so limited. Example apparatus and methods may account for the results of aberrations that are revealed through testing in multiple dimensions under multiple sets of operating parameters for a dynamic system that is accelerating and moving while acquiring images.

While conventional systems may acquire a single image in a single orientation, example apparatus and methods are not so limited. Additionally, while conventional systems may acquire a single image of a grid on a flat surface, example systems and methods are not so limited. Conventional systems may anticipate that the lens will be used to produce images that will be processed using a hemispherical mirror approach for single strip stitching. Example apparatus do not use the hemispherical mirror approach for single strip stitching. Instead, a spherical approach is employed.

Imagine you are standing inside a globe. Like the earth, the globe may not be perfectly spherical in all dimensions. Consider the different processing required to acquire a strip of images around the equator, to acquire a strip of images around the Tropic of Cancer, to acquire a strip of images around the Arctic Circle, and to acquire a strip of images very close to the North Pole. Acquiring a strip of images for each of these meridians on the globe illustrates a three dimensional projection problem for which advanced calibration may be required. A lens and sensor assembly may experience a first set of aberrations when acquiring images around a first meridian (e.g., equator) but may experience a second, different set of aberrations when acquiring images around a second meridian (e.g., Arctic Circle). Even though the same lens and same sensor may be located in the same assembly, different focal lengths, different fields of view, different orientations in a positioning system, and other factors may contribute to different aberrations for which different corrections are sought.

Now imagine that the globe in which you are standing has just expanded to twice its volume. The expansion may not have been uniform. For example the equator may have extended outwards away from the origin of the sphere while the poles may have actually moved closer together and closer toward the origin of the sphere. Calibration data acquired for the first globe may be sub-optimal for the second globe. Conventional systems may account for neither the three dimensional projection problem nor the changing sphere problem. Example apparatus and methods may account for both.

Example apparatus and methods may acquire calibration images from a lens and sensor assembly that moves through six degrees of freedom including translation in x, y, and z planes, as well as rotation about the axes to produce pitch, roll, and yaw. In one embodiment, the calibration data is acquired "in the shop". In another embodiment, calibration data may also be acquired "in the field." "In the shop" refers to a situation where many parameters can be controlled using equipment or processes that are available for calibration. For example, "in the shop" may refer to in a facility (e.g., factory) where the lens or sensor are manufactured, in a facility where the subassembly is assembled, in a facility where the panoramic imaging system is assembled, or other controlled or controllable environment. "In the field" refers to a situation where it may be more difficult to control any parameters. Instead, calibration performed "in the field" may be performed with observed parameters instead of controlled parameters.

Acquiring calibration data may include acquiring an image of a synthetic target. The synthetic target may be spectrum specific. For example, a camera used to acquire light in the visible spectrum may acquire images of a visible grid of parallel and orthogonal lines. The lines may be, for example, black lines on a white background. Some images may be acquired from a grid on a flat surface while other images may be acquired from a grid on a portion of a spherical surface. A sensor used to acquire signals from another spectrum (e.g., IR, NIR, SWIR, MWIR, LWIR) may acquire electromagnetic waves produced by an apparatus that produces parallel and orthogonal lines of IR radiation. Some images may be acquired from a flat surface while other images may be acquired from a portion of a spherical surface. Lines in the images may then be curve-fit and the amount, if any, of curvature in a line may be determined. Information for correcting the curvature in a line may then be computed and stored. Images may be acquired while the lens and sensor assembly moves (e.g., translates, rotates) through the available degrees of freedom. In one embodiment, the synthetic target may also be moved (e.g., translated, rotated) through the available degrees of freedom. Images may be acquired under different conditions (e.g., temperature, humidity, atmospheric pressure, constant motion, non-constant motion). Images may also be acquired for different lens zoom positions that produce different focal lengths. The different lens zoom positions may also produce different FoV, although FoV may be manipulated in other ways. Thus, data that facilitates correcting the actual lens performance to ideal or desired lens performance is acquired in a more robust and complicated manner than for conventional systems. The information is stored to facilitate correcting images on-the-fly when the system is operating.

Figure 4:
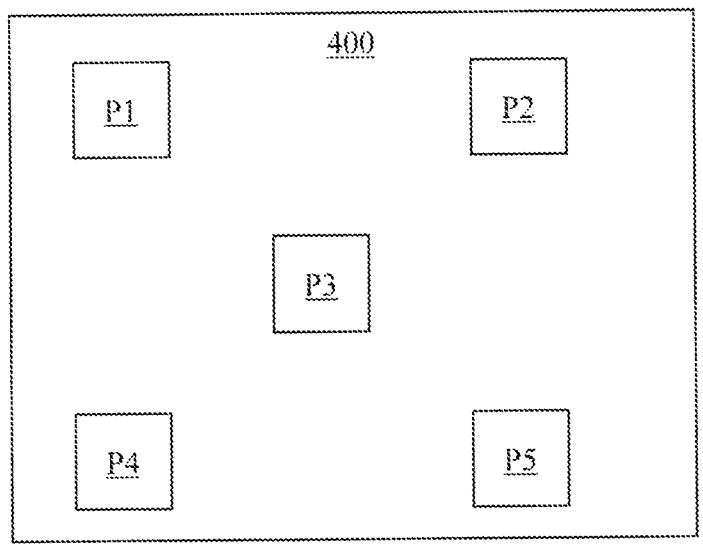
FIG. 4 illustrates example images of a target item.
Figure 4:
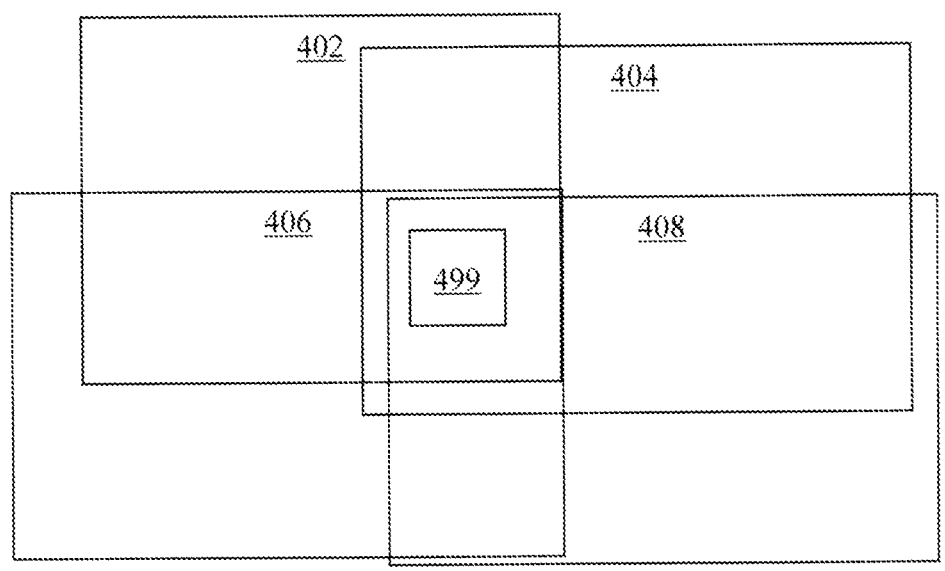

Calibrating a lens and sensor assembly may also include determining the effective focal length of the lens. Improving information about the actual or effective focal length of the lens facilitates improving stitching images together. In one embodiment, determining the effective focal length may include imaging a target of a known size at a known distance. When an item of known size is imaged at a known distance, then the actual focal length can be determined from the actual acquired image. Calibration data for the actual focal length may then be stored. In one embodiment, determining the actual focal length may include determining the numbers of pixels that are covered in different dimensions by the target item when it is imaged at a known distance. The field of view, and thus the actual focal length, may then be determined from the number of pixels that are covered. The actual or effective focal length may be determined for various configurations (e.g., relative positionings) of the lens and sensor assembly. Example apparatus and methods may reposition the image acquisition assembly according to the available degrees of freedom to make the calibration more thorough than conventional systems. Thus, rather than taking a single image of a single item positioned directly in the center of the Fob' for the lens and sensor assembly, example apparatus and methods may move the lens and sensor assembly so that the item is imaged in different locations in the FoV. For example, FIG. 4 illustrates an image 400 that has representations of a target pattern at locations P1, P2, P3, P4, and P5. The image 400 may have been acquired by taking five images with the target pattern 499 at different locations in the field of view of a camera. For example, images 402, 404, 406, and 408 could be taken so that target pattern 499 appears in the four different corners of the resulting images.

Figure 5:
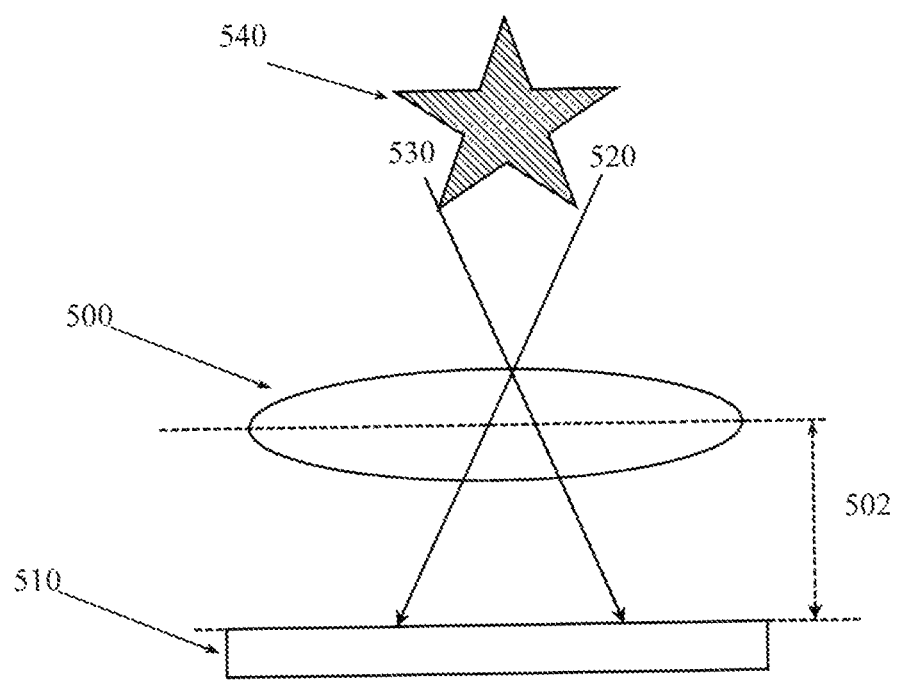
FIG. 5 illustrates an example lens and sensor.

FIG. 5 illustrates an object 540 being imaged by a lens 500 and sensor 510 that are arranged to produce a focal length 502 for the assembly of lens 500 and sensor 510. Light 530 may pass through lens 500 and reach sensor 510 at one location while light 520 may pass through lens 500 and reach sensor 510 at another location. Conventional systems may take this single image to calibrate lens 500 or sensor 510. Example apparatus and methods are not so limited.

Figure 6:
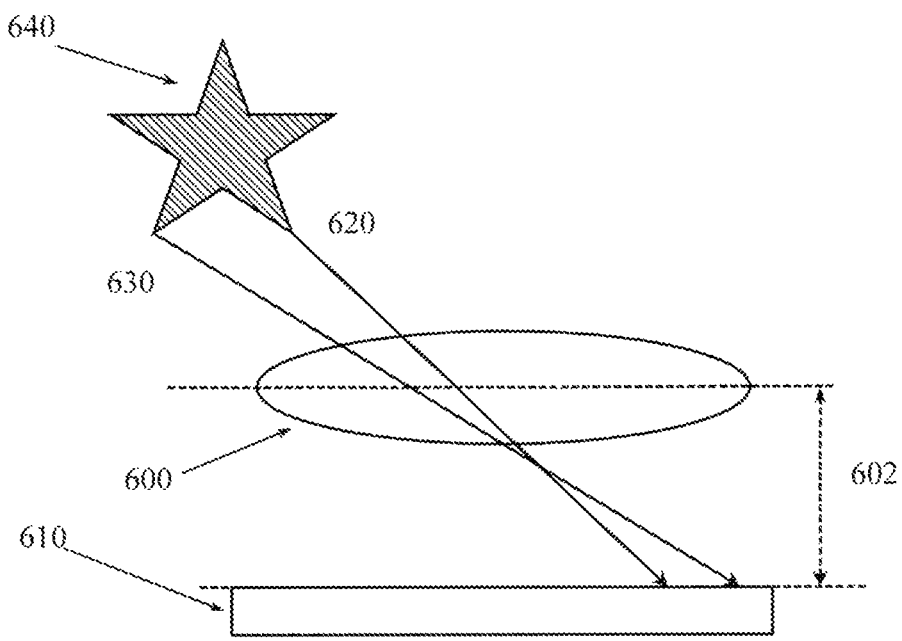
FIG. 6 illustrates an example lens and sensor.

FIG. 6 illustrates an object 640 being imaged in a different way than just the conventional approach illustrated in FIG. 5. FIG. 6 shows object 640 positioned somewhere other than the center of the field of view of lens 600 and sensor 610. Lens 600 and sensor 610 may have the same focal length 602 as lens 500 and sensor 510 in FIG. 5. Light 620 from object 640 may arrive at a different location on sensor 610 via a different path through lens 600 and light 630 from object 640 may arrive at a different location on sensor 610 via a different path through lens 600. Imaging object 640 at different locations may facilitate exposing aberrations in different locations in lens 600. Conventional systems may take calibration images at a single focal length or with objects positioned at a consistent distance from the lens. Example apparatus and methods are not so limited.

Figure 7:
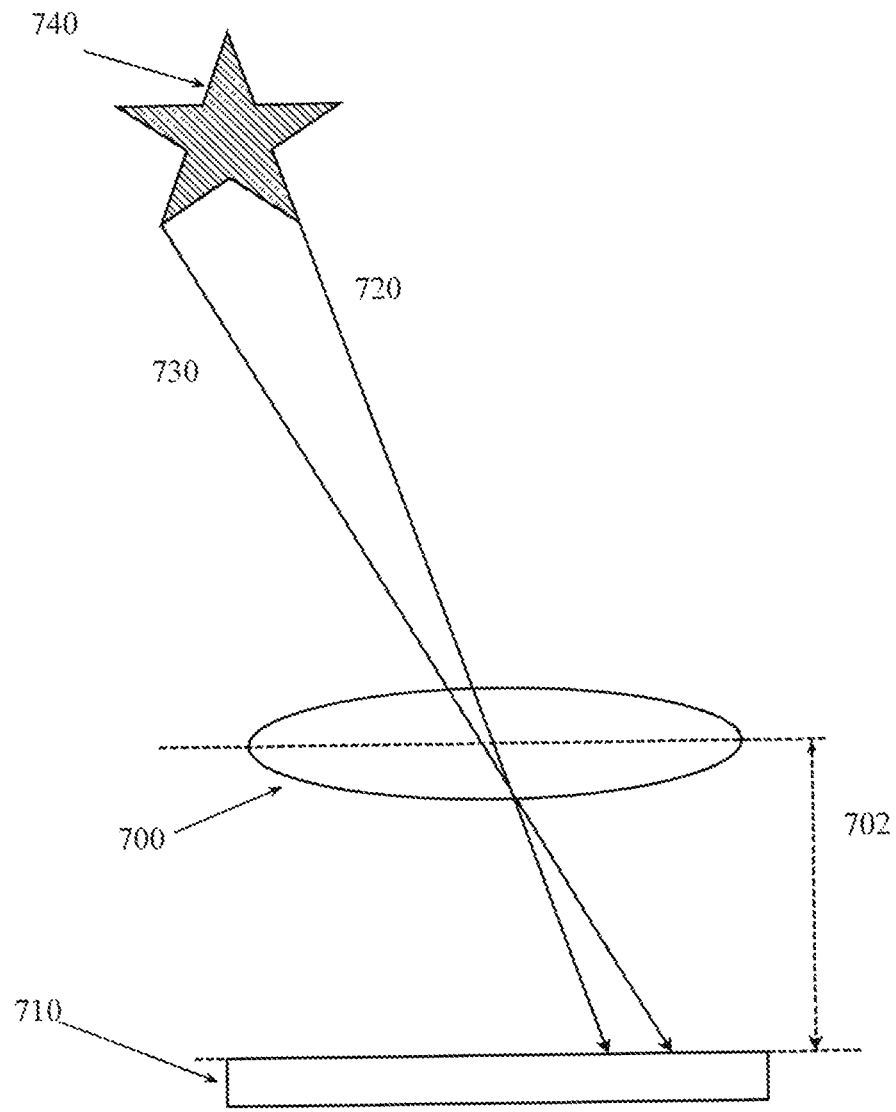
FIG. 7 illustrates an example lens and sensor.

For example, FIG. 7 illustrates an object 740 positioned a greater distance from lens 700. Additionally, lens 700 and sensor 710 are arranged to produce a different focal length 702. Light 730 from object 740 and light 720 from object 740 may arrive at sensor 710 via different paths through lens 700 than in conventional systems. Changing the depth at which object 740 is imaged and changing the focal length between lens 700 and sensor 702 may facilitate revealing aberrations that are missed by conventional systems.

Determining the effective focal length may be performed in the shop or in the field. In one embodiment, an apparatus may include one or more target items that can be placed at known distances to facilitate performing the effective focal length determination in the field. Calibration in the field may facilitate accounting for factors including, for example, damage to a lens, damage to a sensor, heat, humidity, atmospheric pressure, wear and tear, or other factors. In one embodiment, the effective focal length calibration may be performed while the system is in a staring mode (e.g., fixed pan angle, fixed tilt angle, fixed zoom). In another embodiment, the effective focal length calibration may be performed while the system is in panoramic mode (e.g., changing pan angle, changing tilt angle, changing zoom, changing FoV).

During calibration, the lens and sensor assembly may be moved to different known pan angles and tilt angles and images of the target item may be taken at the different azimuths and elevations associated with the pan angles and tilt angles. The angular information from position encoders is used to determine the angular spatial extent that was imaged while the lens and sensor assembly were moved to the different azimuths and elevations. The FoV may then be determined from the spatial extent, and the effective focal length may then be determined from the FoV.

During calibration, the lens and sensor assembly may be moved to different locations at different rates. Consider that a system acquiring images using a calibrated lens and sensor assembly may be rotating through three hundred sixty degrees every second. Consider also that the system may weigh one hundred pounds or more. While rotational motion theoretically does not alter the properties of light or of a lens, accelerating, rotating, panning, or decelerating a machine that weighs over a hundred pounds may cause stresses on a lens, a sensor, a lens/sensor assembly, or other components of an image acquisition system. Therefore, example apparatus and methods may perform the calibration while the system is static, while the system is accelerating or decelerating at different rates, or while the system is moving at a constant rate. Calibration data may be acquired and stored for the different operating parameters.

Figure 9:
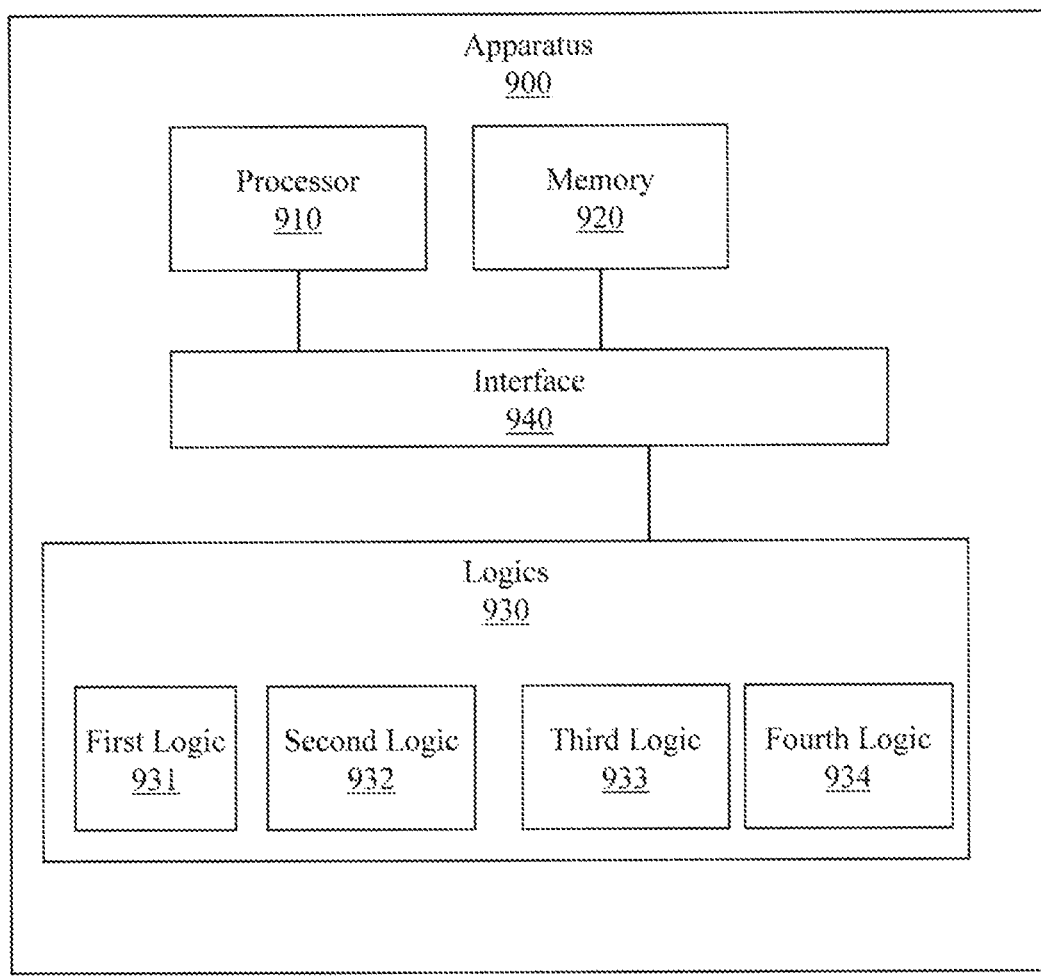
FIG. 9 illustrates an example apparatus for calibrating a panoramic imaging system in multiple dimensions.

FIG. 9 illustrates an apparatus 900 that facilitates calibrating a panoramic view imaging system. Apparatus 900 includes a processor 910, a memory 920, and a set 930 of logics that is connected to the processor 910 and memory 920 by a computer hardware interface 940. In one embodiment, processor 910 and the set of logics 930 may calibrate the panoramic view imaging system under varying conditions that produce superior results to conventional systems.

In one embodiment, the functionality associated with the set of logics 930 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 930 are implemented as ASICs or SOCs. In one embodiment, the first logic 931, the second logic 932, the third logic 933, or the fourth logic 934 may be ASICs, FPGA, or other integrated circuits.

The set 930 of logics includes a first logic 931 that produces image correction data for a lens associated with the panoramic imaging system or a sensor associated with the lens and the panoramic imaging system. In one embodiment, the image correction data is based on an error identified in individual images acquired by the lens or sensor. The individual images are acquired with a plurality of pre-determined operating parameters. Different individual images may be acquired with different values for members of the plurality of pre-determined operating parameters. The pre-determined operating parameters may include, for example, horizontal position, vertical position, target grid co-ordinates, roll, pitch, yaw, field of view, focal length, depth of field, light intensity, angle of fight, volume of field, volume of light, temperature, humidity, atmospheric pressure, pan rate, tilt rate, change in pan rate, or change in tilt rate.

In one embodiment, the individual image may be an image of a calibration pattern. In different embodiments, the calibration pattern may be on a flat surface or may be on a portion of a spherical surface. In one embodiment, to facilitate determining an effective focal length, the individual image may be an image of a calibration item. The calibration item may have a known size and the image may be acquired while the calibration item is positioned at a known distance from the lens.

The apparatus 900 also includes a second logic 932 that produces strip correction data for the lens or sensor. In one embodiment, the strip correction data is based on an error identified in a strip of images pieced together from a plurality of individual images acquired by the lens or sensor. Certain anomalies associated with certain types of aberrations may only become detectable or exceed a fidelity threshold when images are stitched together. Since conventional systems may only produce correction data for individual images, this type of anomaly or aberration may not be handled by conventional systems.

The apparatus 900 also includes a third logic 933 that produces panoramic image correction data for the lens or sensor. In one embodiment, the panoramic image correction data is based on an error identified in a panoramic image pieced together from two or more strips of images processed by the second logic 932. Certain anomalies associated with certain types of aberrations may only become detectable or exceed a fidelity threshold when strips of images are stitched together. Since conventional systems may only produce correction data for individual images, this type of anomaly or aberration may not be handled by conventional systems.

The apparatus 900 also includes a fourth logic 934 that stores correction data in the memory 920. In different embodiments, the fourth logic 934 may store the image correction data, the strip correction data, or the panoramic image correction data in the memory 920. In one embodiment, the fourth logic 934 may store a combined correction value that is computed from the image correction data, the strip correction data, or the panoramic image data. The combined correction value may facilitate accounting for errors in individual images, in strips of images pieced together from individual images, or from panoramic images stitched together from strips of images. To facilitate retrieving appropriate correction data under different operating conditions, fourth logic 934 also stores data that relates the pre-determined operating parameters to the image correction data, the strip correction data, the panoramic image correction data, or the combined correction value.

Apparatus 900 may perform the calibration for more than one sensor. Thus, in one embodiment, the first logic 931 produces image correction data for a second lens associated with the panoramic imaging system or a second sensor associated with the lens and the panoramic imaging system. This image correction data may be based on an error identified in an individual image acquired by the second lens or the second sensor. Like it was for the first sensor, the individual image may be acquired with a plurality of pre-determined operating parameters. The first sensor may be, for example, a sensor that operates on light in the visible spectrum. The second sensor may be, for example, a sensor that operates on electromagnetic waves in other spectra (e.g., infrared (IR), near IR (NIR), short wave IR (SWIR), mid wave IR (MWIR), long wave IR (LWIR), ultraviolet). Different images may be acquired with different pre-determined operating parameters.

In this embodiment, the second logic 932 also produces strip correction data for the second lens or the second sensor and the third logic 933 produces panoramic image correction data for the second lens or the second sensor. With this additional correction data available for the second lens or sensor, the fourth logic 934 stores, in the memory 920, the correction data for the second lens or sensor. In one embodiment, combined correction data may be produced to facilitate correcting for a combined image that is produced from images from the two different types of images.

Figure 10:
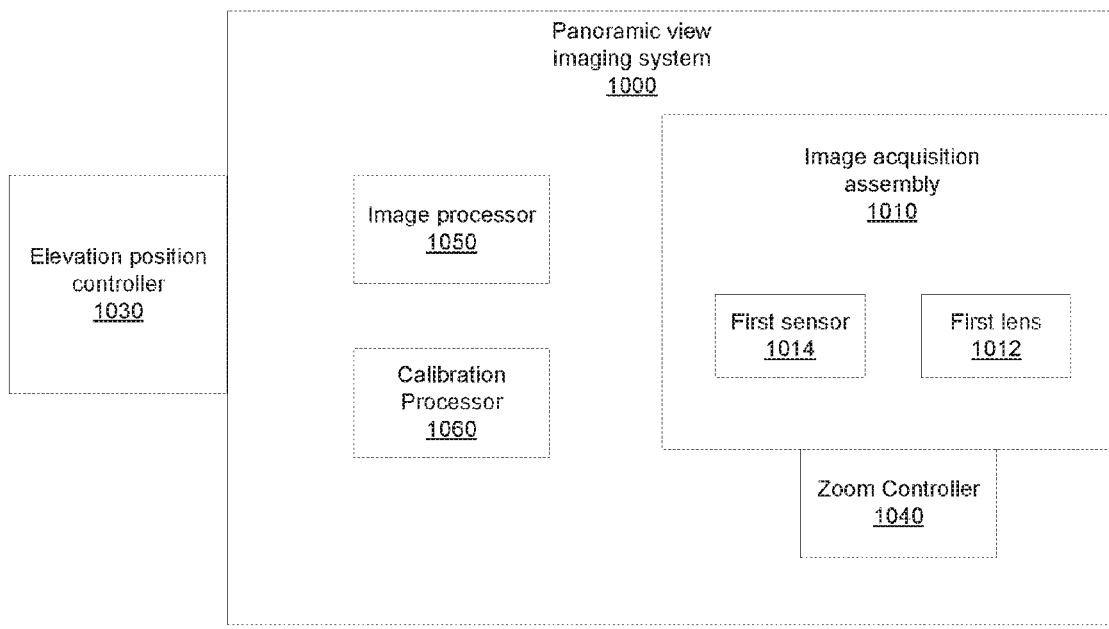
FIG. 10 illustrates an example apparatus for calibrating a panoramic imaging system in multiple dimensions.

FIG. 10 illustrates a panoramic view imaging system 1000 that can be calibrated in multiple dimensions. System 1000 includes a first image acquisition assembly 1010 comprising a first lens 1012 and a first sensor 1014 that produce a first image from light in a visible spectrum. In one embodiment, the first image acquisition assembly 1010 produces first images at a rate of at least sixty images per second. Images may be acquired at other rates.

The system 1000 includes a rotational position controller 1020 that pans the system 1000 or first image acquisition assembly 1010 through a range of horizontal imaging positions and an elevation position controller 1030 that tilts the system 1000 or the first image acquisition 1010 assembly through a range of vertical imaging positions. In one embodiment, the range of horizontal imaging positions is three hundred and sixty degrees, and the range of vertical imaging positions is at least one hundred and eighty degrees. Other ranges may be employed.

The apparatus 1000 also includes a zoom controller 1040 that changes the focal length of the first image acquisition assembly 1010 by, for example, moving the lens 1012 with respect to the sensor 1014 or vice versa. Zoom is just one parameter that may be manipulated during calibration. Other calibration parameters that can be manipulated may include, for example, horizontal position, vertical position, target grid co-ordinates, roll, pitch, yaw, field of view, focal length, depth of field, volume of field, volume of light, light intensity, angle of light, temperature, humidity, atmospheric pressure, pan rate, tilt rate, change in pan rate, or change in tilt rate.

The apparatus 1000 also includes an image processor 1050 that produces a panoramic image from a plurality of images produced by the first image acquisition assembly 1010. The panoramic image has a field of view greater in both a horizontal dimension and a vertical dimension than a single image acquired by the first image acquisition assembly 1010. The panoramic image is produced without using a hemispherical mirror.

The apparatus 1000 also has a calibration processor 1060 that calibrates the panoramic view imaging system 1000. Calibrating the panoramic view imaging system 1000 may involve several actions. The actions may include, calibrating the first lens 1012 with a pre-characterized sensor, calibrating the first sensor 1014 with a pre-characterized lens, calibrating the first lens 1012 and the first sensor 1014 arranged together in the first image acquisition assembly 1010, or calibrating the first image acquisition assembly 1010 mounted in the panoramic view imaging system 1000. Conventional systems may only perform one of these actions.

Calibrating the panoramic view imaging system 1000 facilitates mitigating an effect of an aberration in the first lens 1012 or an aberration in the first sensor 1014. The aberrations may reduce the fidelity of an image produced by the panoramic view imaging system 1000. Calibrating the first lens 1012 with a pre-characterized sensor may include acquiring a first plurality of images of at least one member of a set of target patterns. The target patterns may include a grid pattern on a flat surface, a grid pattern on a portion of a spherical surface, or other patterns. Members of the first plurality of images are acquired using the first lens 1012 and the pre-characterized sensor with different calibration parameter values. For example, the light intensity, light angle, position of the target image, orientation of the target image with respect to the lens 1012, or other parameters may be varied. After acquiring the plurality of images, calibrating the first lens 1012 may include identifying a first aberration in the first lens 1012 from the first plurality of images. Once the aberrations are identified, the calibrating may include determining a first set of correction values for mitigating an effect of the first aberration in the first lens 1012. The correction values may be used by a computerized transform process to change an acquired image to be closer to an ideal image. Once the correction values are computed they may be stored on a computer-readable medium along with data that relates the first set of correction values and the calibration parameter values.

Since an image may depend on both a lens and a sensor, both the lens 1012 and the sensor 1014 may be calibrated separately with known components. In one embodiment, calibrating the first sensor 1014 with the pre-characterized lens includes acquiring a second plurality of images of at least one member of the set of target patterns. Members of the second plurality of images are acquired using the pre-characterized lens and the first sensor 1014 with different calibration parameter values. A second aberration may be identified in the first sensor 1014 from the second plurality of images. With the aberration identified, a second set of correction values may be determined for mitigating an effect of the second aberration in the first sensor 1014. In one embodiment, the calibration may the proceed by selectively manipulating a member of the first set of correction values stored on the computer-readable medium based, at least in part, on the second set of correction values. In another embodiment the second set of correction values may be stored separately on the computer-readable medium.

Some aberrations may produce anomalies when the lens 1012 and sensor 1014 operate together. Thus, in one embodiment, the calibrating may include calibrating the first lens 1012 and the first sensor 1014 arranged together in the first image acquisition assembly 1010. This calibrating may include acquiring a third plurality of images of at least one member of the set of target patterns. The members of the third plurality of images are acquired using the first lens 1012 and the first sensor 1014 arranged together in the first image acquisition assembly 1010 using different values for the calibration parameters. For example, the focal length, the field of view, the pan position, tilt position, or other parameters may be varied. A third aberration associated with the first lens 1012 or a third aberration associated with the first sensor 1014 may be identified from the third plurality of images and a third set of correction values for mitigating their effects may be produced. These correction values may then be used to manipulate a member of the first set of correction values stored on the computer-readable medium or may be stored by themselves.

Forces may be produced by the movement and acceleration or deceleration of the panoramic view imaging system 1000. Thus, calibrating the first image acquisition assembly 1010 may include mounting the assembly 1010 in the system 1000 and operating the system 1000 under different operating conditions. This calibrating may include acquiring a fourth plurality of images of at least one member of the set of target patterns. A fourth aberration in the first lens 1012 or a fourth aberration in the first sensor 1014 may be identified from the fourth plurality of images. A fourth set of correction values for mitigating an effect of the fourth aberration in the first lens 1012 or the fourth aberration in the first sensor 1014 may then be computed and used to selectively manipulate a member of the first set of correction values stored on the computer-readable medium. In one embodiment, the fourth set of correction values may be stored by themselves.

While conventional systems may perform some calibration for a lens using a single imaging approach, apparatus 1000 is not so limited. Thus, in one embodiment, the calibration processor 1060 may produce a strip of images from images acquired by the first image acquisition assembly 1010. Producing the strip of images may include positioning the images relative to each other based, at least in part, on pattern matching an item visible in overlapping portions of the images. For example, an edge or other distinguishable feature may be aligned in the overlap of the two images to position them correctly. Once they are positioned, additional anomalies associated with additional aberrations may be detected. Thus, the calibrating may include identifying a fifth aberration in the first sensor 1014 or a fifth aberration in the first lens 1012 from the fifth plurality of images. A fifth set of correction values for mitigating an effect of the fifth aberration in the first lens 1012 or the fifth aberration in the first sensor 1014 may then be computed and used to selectively manipulate a member of the first set of correction values stored on the computer-readable medium. In one embodiment, the fifth set of correction values may be stored on the computer-readable medium.

Stitching images together into a strip may facilitate identifying aberrations and anomalies that might not be otherwise detected. Stitching strips together into a panoramic image may also facilitate identifying additional aberrations or anomalies. Thus, in one embodiment, the calibration processor 1060 may produce a panoramic image from strips of images. The panoramic image may be produced by positioning the strips of images based, at least in part, on pattern matching of an item visible in the overlapping portions of the strips of images. For example, an edge or other feature may be used to align the strips of images. Once the panoramic image has been produced, the calibration may include identifying a sixth aberration in the first sensor 1014 or a sixth aberration in the first lens 1012 from the panoramic image. A sixth set of correction values for mitigating an effect of the sixth aberration in the first lens 1012 or the sixth aberration in the first sensor 1014 may then be computed and used to selectively manipulate a member of the first set of correction values stored on the computer-readable medium. In one embodiment, the sixth set of correction values may be stored on the computer-readable medium.

While the arrangement of the lens 1012 and the sensor 1014 may have a theoretical focal length, the actual arrangement in a production system operating in the field may produce focal lengths that deviate from the theoretical. Thus, in one embodiment, the calibration processor 1060 may calibrate the panoramic view imaging system 1000 by acquiring, under a known set of values for the calibration parameters, a test image of a target item having a known size. The test image is acquired with the target item positioned at a known location (e.g., distance from lens 1012) and thus values (e.g., dimensions, intensities) for the resulting image may be anticipated. If the actual values differ from the anticipated values, then the actual focal length may be different than the theoretical focal length. In one embodiment, calibration may include determining an effective focal length of the first image acquisition 1010 assembly based, at least in part, on a number of elements in the first sensor 1014 that receive light from the target item while acquiring the test image. The effective focal length may then be used to selectively manipulate a member of the first set of correction values stored on the computer-readable medium. In one embodiment, the effective focal length may be stored on the computer-readable medium.

The calibration may be repeated for a second lens and a second sensor. The second lens and second sensor may operate in a different spectrum than the first lens and the first sensor. In one embodiment, when composite images that combine imagery from multiple sensors are produced, aberrations that only appear when the images are combined may be detected and correction data for the composite imagery may be produced. Once the correction values are acquired, they may be used to correct subsequently acquired images.

Thus, in one embodiment, the calibration processor 1060 may produce a combined image from the first panoramic image and the second panoramic image and identify a combined aberration from the combined image. The calibration processor 1060 may then determine a combined correction value to mitigate the effect of the combined aberration. The calibration processor 1060 may then selectively manipulate correction values stored on the computer-readable medium based on the combined correction value.

After calibration, the panoramic view imaging system 1000 may be used to produce panoramic view images of a scene. During operation, the calibration processor 1060 acquires an initial image of a scene with known calibration parameters, acquires a set of desired imaging parameters (e.g., zoom level, field of view), and acquires a set of current operating parameters (e.g., temperature, humidity, atmospheric pressure, pan rate, change in pan rate, tilt rate, change in tilt rate). The calibration processor 1060 may then retrieve a subset of correction values from the computer-readable medium. The subset may be selected based, at least in part, on the set of desired imaging parameters and the set of current operating parameters. For example, if the panoramic view imaging system is operating in a desert environment in bright sunlight and is scanning terrain up to several miles away, then a first subset of relevant correction values may be retrieved and stored in a cache memory or register available to the image processor 1050.

The image processor 1050 will then acquire an individual image for use in producing the panoramic image and correct the individual image using a member of the subset stored in the cache memory or register. By moving relevant data closer to the image processor 1050, efficiency may be improved. For example, fewer input/output operations may be required. Performing fewer input/output operations may improve speed while reducing operating temperatures, which may in turn improve the efficiency of the system by requiring less cooling.

Conditions in the field may change, therefore, in one embodiment, upon detecting a change in the set of desired imaging parameters or the set of current operating parameters, the calibration processor 1060 may acquire an updated set of desired imaging parameters, acquire an updated set of current operating parameters, and selectively update the subset in the cache memory or in the register based on the updated set of desired imaging parameters or the updated set of current operating parameters. The updated set of desired imaging parameters may then be used to correct subsequently acquired images.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 11:
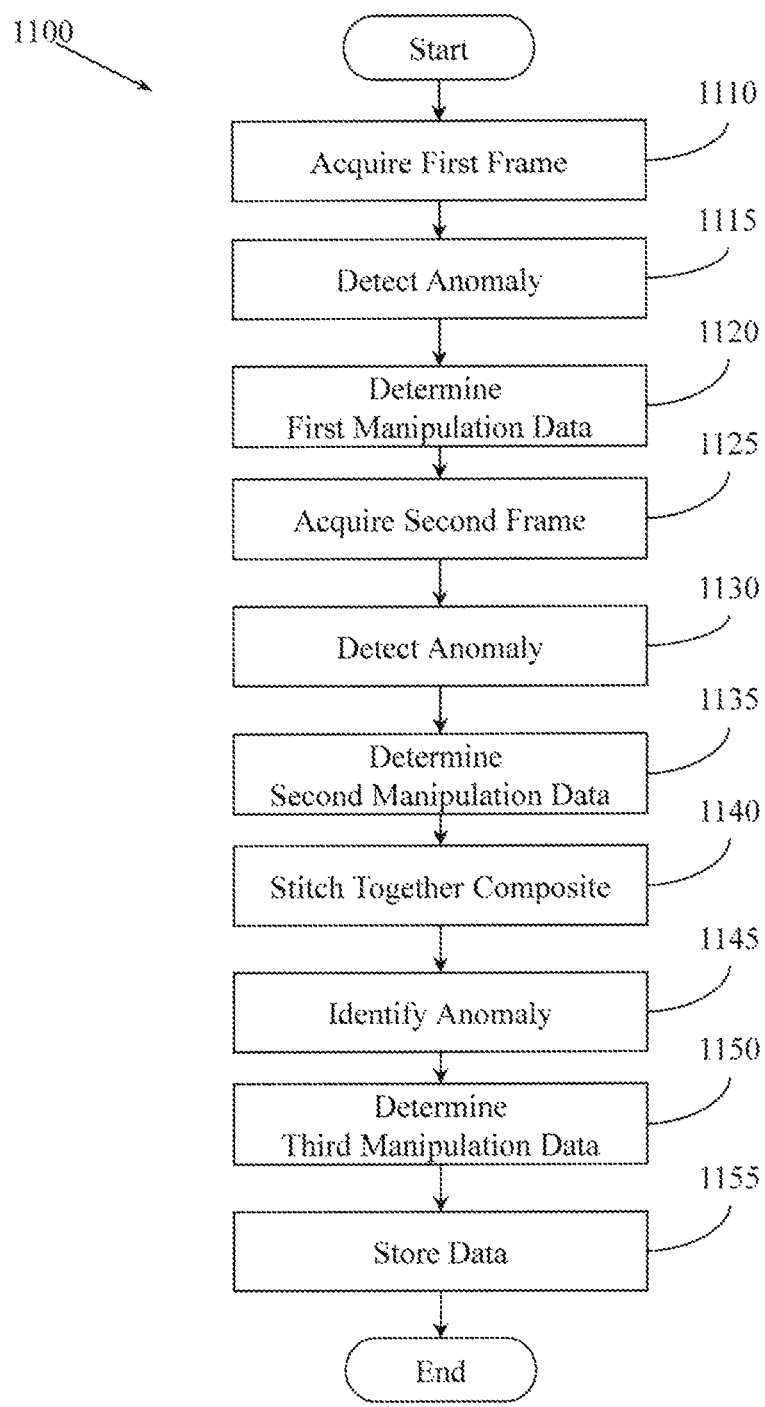
FIG. 11 illustrates an example method associated with calibrating a panoramic imaging system in multiple dimensions.

FIG. 11 illustrates an example computerized method 1100 associated with calibrating a panoramic view imaging system. Method 1100 can only be performed in a computer because electronic voltages or other computer signals need to be generated to facilitate correcting electronic data values produced by a lens and an electronic sensor. These electronic voltages or other computer signals cannot be generated by pen and paper or in the human mind. Method 1100 includes, at 1110, acquiring a first frame from a panoramic view imaging system. The first frame is acquired with a pre-determined set of operating parameters. The operating parameters may include, for example, horizontal position, vertical position, target grid co-ordinates, roll, pitch, yaw, field of view, focal length, depth of field, light intensity, angle of light, volume of field, volume of light, temperature, humidity, atmospheric pressure, pan rate, tilt rate, change in pan rate, or change in tilt rate.

Method 1100 also includes, at 1115, detecting an anomaly in the first frame. The anomaly may be detected by, for example, examining the straightness or other properties of lines in an image of a target pattern. While patterns of horizontal intersecting lines are illustrated in FIG. 8, other types of patterns may be employed.

Method 1100 also includes, at 1120, determining first manipulation data that facilitates correcting the first frame. The first manipulation data may take the form of mathematical coefficients for which electronic data is stored. The electronic data may then be used to convert an acquired image to a corrected image that exceeds a fidelity threshold.

Method 1100 also includes, at 1125, acquiring a second frame from the panoramic view imaging system. Unlike conventional systems, the second frame is acquired with a second, different, pre-determined set of operating parameters than were used for the first frame. In one embodiment, a calibration session may cycle through a variety of pre-determined values to exercise the lens and sensor to reveal aberrations or anomalies that may not be detected in conventional systems. Thus, actions 1110-1120 and 1125-1135 may be performed repeatedly.

Method 1100 also includes, at 1130, identifying an anomaly in the second frame. The anomaly may be detected by identifying a mismatch between an actual image and a desired image.

Method 1100 also includes, at 1135, determining second manipulation data that facilitates correcting the second frame. The second manipulation data may take the form of electronic signals that represent mathematical values that may be used for a transform that is applied to an acquired image to make a corrected image that exhibits a desired level of fidelity with a known calibration image or target pattern.

Method 1100 also includes, at 1140, stitching together a composite image from the first frame and the second frame.

The composite image has a greater field of view than either the first frame or the second frame. The composite image may be made by partially overlapping the first frame and the second frame. While a first frame and a second frame are described, in one embodiment, a plurality of first frames or a plurality of second frames may be acquired and stitched together to make the composite image.

Method 1100 also includes, at 1145, identifying an anomaly in the composite image. Certain anomalies that cause image fidelity to fall below a threshold may only be revealed when individual frames are stitched together into a composite image.

With the additional anomaly discovered, method 1108 then proceeds, at 1150, by determining third manipulation data that facilitates correcting the composite image.

Method 1100 also includes, at 1155, storing the first manipulation data, the second manipulation data, or the third manipulation data in a computer-readable medium. The data may be stored in a fashion that facilitates retrieving different manipulation data that corresponds to different operating parameters. For example, records may be added to a relational database, entries may be made in a table, or values may be stored in linked lists or other data structures. These values may then be retrieved while the panoramic view imaging system is operating to produce panoramic images in the field.

Figure 12:
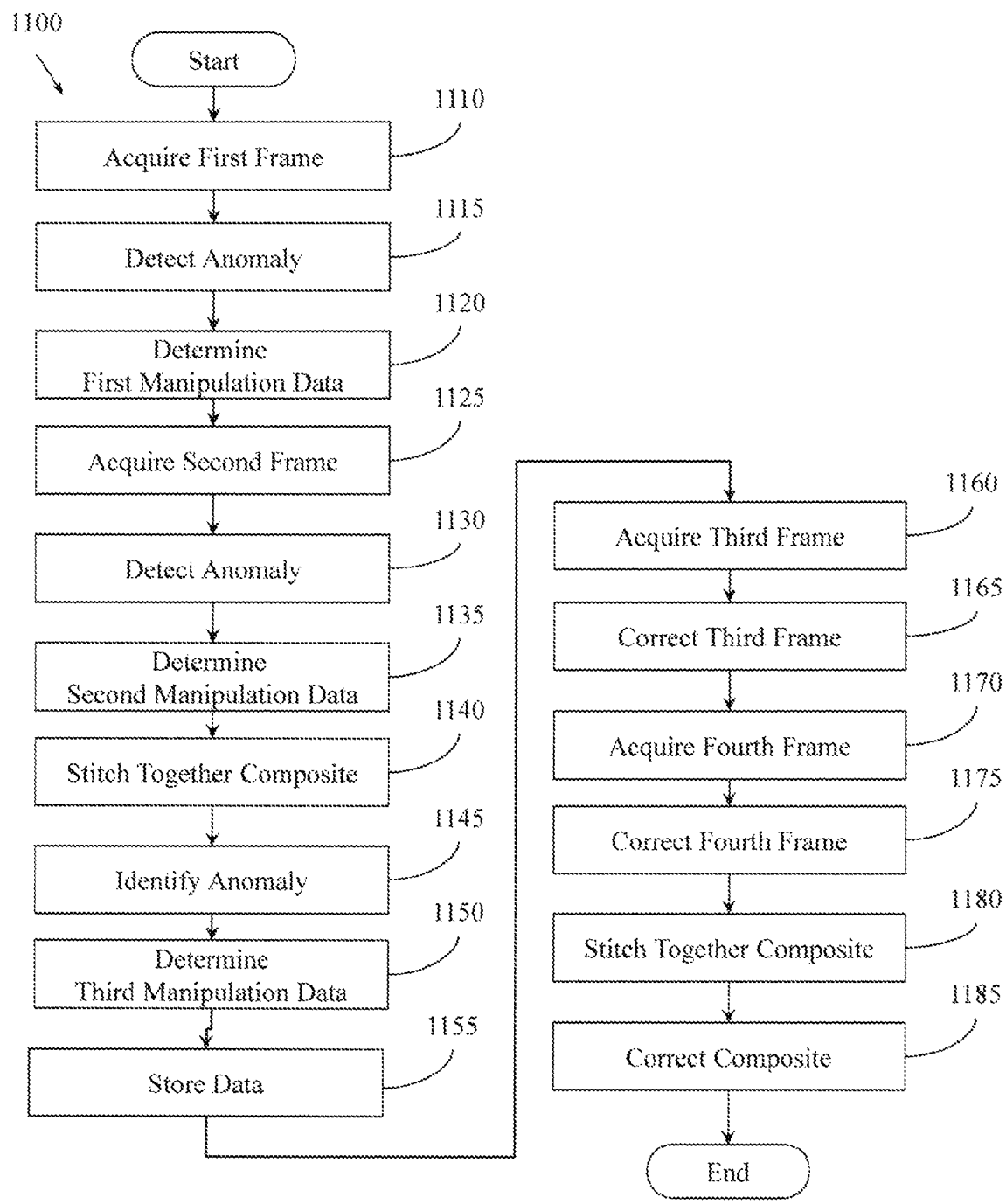
FIG. 12 illustrates an example method associated with calibrating a panoramic imaging system in multiple dimensions.

FIG. 12 illustrates another embodiment of method 1100. This embodiment uses the correction data produced in actions 1110 through 1150 to correct subsequently acquired images. Thus, this embodiment also includes, at 1160, acquiring a third frame from the panoramic view imaging system and, at 1165, correcting the third frame using the first manipulation data or the second manipulation data.

Method 1100 also includes, at 1170, acquiring a fourth frame from the panoramic view imaging system and, at 1175, correcting the fourth frame using the first manipulation data or the second manipulation data. Thus actions 1175 and 1165 concern correcting individual images using correction data that was acquired during a calibration process. While a single third frame and a single fourth frame are described, method 1100 may include acquiring and correcting a plurality of images. Since the Images may be acquired under different operating conditions, different correction data that corresponds to the operating conditions may be accessed to correct the images. In one embodiment, the most relevant correction data may be stored in a computer memory that is fastest for an image processor to acquire. For example, a cache memory or register in the image processor may be populated with relevant correction data.

Method 1100 also includes, at 1180, stitching together a second composite image from the third frame and the fourth frame. The second composite image has a greater field of view than either the third frame or the fourth frame. While a single third frame and fourth frame are described, a plurality of images may be used to produce the second composite image. The second composite image may then be corrected at 1185 using the third manipulation data.

While the embodiment in FIG. 12 shows all of actions 1110 through 1185 occurring in one sequence, in one embodiment, actions 1110 through 1155 may be performed at a first time (e.g., during calibration in the shop) and actions 1160 through 1185 may be performed at a second time (e.g., during operation in the field).

In one example, a method may be implemented as computer executable instructions. Thus, in one example, a computer-readable medium may store computer executable instructions that if executed by a machine (e.g., processor) cause the machine to perform method 1100. While executable instructions associated with method 1100 are described as being stored on a computer-readable medium, it is to be appreciated that executable instructions associated with other example methods described herein may also be stored on a computer-readable medium.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, refers to computer hardware or firmware, and/or combinations of each to perform a function (s) or an action(s), and/or to cause a function or action from another logic, method, and/or system. Logic may include, for example, an instruction controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to, electrical signals, optical signals, analog signals, digital signals, data, computer instructions, processor instructions, messages, a bit, or a bit stream, that can be received, transmitted and/or detected.

"User", as used herein, includes but is not limited to one or more persons, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d, Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A panoramic view imaging system, comprising:
a first image acquisition assembly comprising a first lens and a first sensor that produce a first image from light in a visible spectrum, where the first image acquisition assembly produces first images at a rate of at least sixty images per second;
a rotational position controller that pans the first image acquisition assembly through a range of horizontal imaging positions;
an elevation position controller that tilts the first image acquisition assembly through a range of vertical imaging positions;
a zoom controller that changes the focal length of the first image acquisition assembly;
an image processor that produces a panoramic image from a plurality of images produced by the first image acquisition assembly, where the panoramic image has a field of view greater in both a horizontal dimension and a vertical dimension than a single image acquired by the first image acquisition assembly, and where the panoramic image is produced without using a hemispherical mirror; and
a calibration processor that calibrates the panoramic view imaging system by:
calibrating the first lens with a pre-characterized sensor;
calibrating the first sensor with a pre-characterized lens;
calibrating the first lens and the first sensor arranged together in the first image acquisition assembly; or
calibrating the first image acquisition assembly mounted in the panoramic view imaging system,
where calibrating the panoramic view imaging system facilitates mitigating an effect of an aberration in the first lens or an aberration in the first sensor;

a second image acquisition assembly comprising a second lens and a second sensor that produce a second image from electromagnetic radiation in a spectrum outside the visible spectrum, where the second image acquisition assembly produces second images at a rate of at least sixty images per second, and
where the calibration processor calibrates the panoramic view imaging system by:
calibrating the second lens with a second pre-characterized sensor;
calibrating the second sensor with a second pre-characterized lens;
calibrating the second lens and the second sensor arranged together in the second image acquisition assembly; or
calibrating the second image acquisition assembly mounted in the panoramic view imaging system,
where calibrating the panoramic view imaging system facilitates mitigating an effect of an aberration in the second lens or in the second sensor;
where calibrating the second lens with the second pre-characterized sensor includes:
acquiring a first plurality of second images of at least one member of a second set of target patterns using the second lens and the second pre-characterized sensor, where members of the first plurality of second images are acquired with a first set of calibration parameter values;
identifying a first aberration in the second lens from the first plurality of second images;
determining a second set of first correction values for mitigating an effect of the first aberration in the second lens; and
storing, on a computer-readable medium, the second set of first correction values, the first set of calibration parameter values, and data that relates the second set of first correction values and the first set of calibration parameter values:
where calibrating the second sensor with the second pre-characterized lens includes:
acquiring a second plurality of second images of at least one member of the second set of target patterns using the second pre-characterized lens and the second sensor, where members of the second plurality of second images are acquired with a second set of calibration parameter values;
identifying a second aberration in the second sensor from the second plurality of second images;
determining a second set of second correction values for mitigating an effect of the second aberration in the second sensor; and
updating a member of the second set of first correction values stored on the computer-readable medium based, at least in part, on the second set of second correction values;
where calibrating the second lens and the second sensor arranged together in the second image acquisition assembly includes:
acquiring a third plurality of second images of at least one member of the second set of target patterns using the second lens and the second sensor arranged together in the second image acquisition assembly, where members of the third plurality of second images are acquired with a third set of calibration parameter values;

identifying a third aberration in the second lens or a third aberration in the second sensor from the third plurality of second images;

determining a third set of second correction values for mitigating an effect of the third aberration in the second lens or the third aberration in the second sensor; and updating a member of the second set of first correction values stored on the computer-readable medium based, at least in part, on the third set of second correction values;

where calibrating the second image acquisition assembly mounted in the panoramic view imaging system includes:

acquiring a fourth plurality of second images of at least one member of the second set of target patterns using the second image acquisition assembly mounted in the panoramic view imaging system, where members of the fourth plurality of second images are acquired with a fourth set of calibration parameter values;

identifying a fourth aberration in the second lens or a fourth aberration in the second sensor from the fourth plurality of second images;

determining a fourth set of second correction values for mitigating an effect of the fourth aberration in the second lens or the fourth aberration in the second sensor; and updating a member of the second set of first correction values stored on the computer-readable medium based, at least in part, on the fourth set of correction values;

producing a second strip of images from two or more second images acquired by the second image acquisition assembly, where producing the second strip of images includes positioning the two or more second images based, at least in part, on pattern matching of an item visible in the overlapping portions of the two or more images;

identifying a fifth aberration in the second lens or a fifth aberration in the second sensor from the second strip of images;

determining a fifth set of second correction values for mitigating an effect of the fifth aberration in the second lens or the fifth aberration in the second sensor; and updating a member of the second set of first correction values stored on the computer-readable medium based, at least in part, on the fifth set of second correction values;

producing a second panoramic image from two or more second strips of images, where producing the second panoramic image includes positioning the two or more second strips of images based, at least in part, on pattern matching of an item visible in the overlapping portions of the two or more second strips of images;

identifying a sixth aberration in the second lens or a sixth aberration in the second sensor from the second panoramic image;

determining a sixth set of second correction values for mitigating an effect of the sixth aberration in the second lens or the sixth aberration in the second sensor; and updating a member of the second set of first correction values stored on the computer-readable medium based, at least in part, on the sixth set of second correction values;

acquiring, under a known set of calibration parameter values, a second test image of a target item having a known size, where the second test image is acquired with the target item positioned at a known location;

determining a second effective focal length of the second image acquisition assembly based, at least in part, on a number of elements in the second sensor that receive electromagnetic radiation in the spectrum outside the visible spectrum from the target item while acquiring the second test image, and updating a member of the second set of first correction values stored on the computer-readable medium based on the second effective focal length.

2. The panoramic view imaging system of claim 1, where the range of horizontal imaging positions is three hundred and sixty degrees, and where the range of vertical imaging positions is at least one hundred and eighty degrees.

3. The panoramic view imaging system of claim 1, where calibrating the first lens with the pre-characterized sensor includes:

acquiring a first plurality of images of at least one member of a set of target patterns, where members of the first plurality of images are acquired using the first lens with a first set of calibration parameter values and the pre-characterized sensor with a second set of calibration parameter values;

identifying a first aberration in the first lens from the first plurality of images;

determining a first set of correction values for mitigating an effect of the first aberration in the first lens; and storing, on a computer-readable medium, the first set of correction values, the first and second sets of calibration parameter values, and data that relates the first set of correction values and the first and second sets of calibration parameter values.

4. The panoramic view imaging system of claim 3, where the first set of calibration parameters include horizontal position, vertical position, target grid co-ordinates, roll, pitch, yaw, field of view, focal length, depth of field, volume of field, volume of light, light intensity, angle of light, temperature, humidity, atmospheric pressure, pan rate, tilt rate, change in pan rate, or change in tilt rate.

5. The panoramic view imaging system of claim 3, where the set of target patterns include a grid pattern on a flat surface or a grid pattern on a portion of a spherical surface.

6. The panoramic view imaging system of claim 4, where calibrating the first sensor with the pre-characterized lens includes:

acquiring a second plurality of images of at least one member of the set of target patterns, where members of the second plurality of images are acquired using the pre-characterized lens with a third set of calibration parameter values and the first sensor with a fourth set of calibration parameter values;

identifying a second aberration in the first sensor from the second plurality of images;

determining a second set of correction values for mitigating an effect of the second aberration in the first sensor; and updating a member of the first set of correction values stored on the computer-readable medium based, at least in part, on the second set of correction values.

7. The panoramic view imaging system of claim 6, where calibrating the first lens and the first sensor arranged together in the first image acquisition assembly includes:

acquiring a third plurality of images of at least one member of the set of target patterns, where members of the third plurality of images are acquired using the first lens and the first sensor arranged together in the first image acquisition assembly with a fifth set of calibration parameter values;

identifying a third aberration in the first lens or a third aberration in the first sensor from the third plurality of images;

determining a third set of correction values for mitigating an effect of the third aberration in the first lens or the third aberration in the first sensor; and updating a member of the first set of correction values stored on the computer-readable medium based, at least in part, on the third set of correction values.

8. The panoramic view imaging system of claim 7, where calibrating the first image acquisition assembly mounted in the panoramic view imaging system includes:

acquiring a fourth plurality of images of at least one member of the set of target patterns, where members of the fourth plurality of images are acquired using the first image acquisition assembly mounted in the panoramic view imaging system with a sixth set of calibration parameter values;

identifying a fourth aberration in the first lens or a fourth aberration in the first sensor from the fourth plurality of images;

determining a fourth set of correction values for mitigating an effect of the fourth aberration in the first lens or the fourth aberration in the first sensor; and updating a member of the first set of correction values stored on the computer-readable medium based, at least in part, on the fourth set of correction values.

9. The panoramic view imaging system of claim 8, where the calibration processor:

produces a strip of images from two or more images acquired by the first image acquisition assembly, where producing the strip of images includes positioning the two or more images based, at least in part, on pattern matching an item visible in overlapping portions of the two or more images;

identifies a fifth aberration in the first sensor or a fifth aberration in the first lens from a fifth plurality of images;

determines a fifth set of correction values for mitigating an effect of the fifth aberration in the first lens or the fifth aberration in the first sensor; and updates a member of the first set of correction values stored on the computer-readable medium based, at least in part, on the fifth set of correction values.

10. The panoramic view imaging system of claim 9, where the calibration processor:

produces a panoramic image from two or more strips of images, where producing the panoramic image includes positioning the two or more strips of images based, at least in part, on pattern matching of an item visible in the overlapping portions of the two or more strips of images;

identifies a sixth aberration in the first sensor or a sixth aberration in the first lens from the panoramic image;

determines a sixth set of correction values for mitigating an effect of the sixth aberration in the first lens or the sixth aberration in the first sensor; and updates a member of the first set of correction values stored on the computer-readable medium based, at least in part, on the sixth set of correction values.

11. The panoramic view imaging system of claim 1, where the calibration processor calibrates the panoramic view imaging system by:

acquiring, under a known set of calibration parameter values, a test image of a target item having a known size, where the test image is acquired with the target item positioned at a known location;

determining an effective focal length of the first image acquisition assembly based, at least in part, on a number of elements in the first sensor that receive light from the target item while acquiring the test image, and updating a member of the first set of correction values stored on the computer-readable medium based on the effective focal length.

12. The panoramic view imaging system of claim 1, where the calibration processor:

produces a combined image from the first panoramic image and the second panoramic image;

identifies a combined aberration from the combined image;

determines a combined correction value to mitigate the effect of the combined aberration; and updates a member of the first set of correction values based on the combined correction value, or updates a member of the second set of first correction values based on the combined correction value.

13. The panoramic view imaging system of claim 11, where the calibration processor:

acquires an initial image of a scene, where the initial image is acquired with known calibration parameters;

acquires a set of desired imaging parameters;

acquires a set of current operating parameters;

retrieves a subset of the first set of correction values from the computer-readable medium, where the subset is selected based, at least in part, on the set of desired imaging parameters and the set of current operating parameters; and stores the subset in a cache memory or register available to the imaging processor, and where the image processor:

acquires an individual image for use in producing the panoramic image; and corrects the individual image using a member of the subset stored in the cache memory or register.

14. The panoramic view imaging system of claim 13, where the calibration processor, upon detecting a change in the set of desired imaging parameters or the set of current operating parameters:

acquires an updated set of desired imaging parameters;

acquires an updated set of current operating parameters; and selectively updates the subset in the cache memory or in the register based on the updated set of desired imaging parameters or the updated set of current operating parameters.

15. An apparatus for calibrating a panoramic imaging system, comprising:

a processor;

a memory;

a set of logics; and a hardware interface that connects the processor, the memory, and the set of logics;

the set of logics comprising:

a first logic that produces image correction data for a lens associated with the panoramic imaging system or a sensor associated with the lens and the panoramic imaging system, where the image correction data is based on an error identified in an individual image acquired by the lens or sensor, where the individual image was acquired with a plurality of pre-determined operating parameters;

a second logic that produces strip correction data for the lens or sensor, where the strip correction data is based on an error identified in a strip of images pieced together from a plurality of individual images acquired by the lens or sensor;

a third logic that produces panoramic image correction data for the lens or sensor, where the panoramic image correction data is based on an error identified in a panoramic image pieced together from two or more strips of images processed by the second logic; and a fourth logic that stores, in the memory, the image correction data, the strip correction data, the panoramic image correction data, or a combined correction value computed from the image correction data, the strip correction data, and the panoramic image data, and data that relates the pre-determined operating parameters to the image correction data, the strip correction data, the panoramic image correction data, or the combined correction value, where the pre-determined operating parameters include horizontal position, vertical position, target grid coordinates, roll, pitch, yaw, field of view, focal length, depth of field, light intensity, angle of light, volume of field, volume of light, temperature, humidity, atmospheric pressure, pan rate, tilt rate, change in pan rate, or change in tilt rate.

16. The apparatus of claim 15,
where the individual image is an image of a calibration pattern, where the calibration pattern is on a flat surface or on a portion of a spherical surface; or
where the individual image is an image of a calibration item, where the calibration item has a known size, and where the individual image is acquired while the calibration item is positioned at a known distance from the lens.

17. The apparatus of claim 16,
where the first logic produces second image correction data for a second lens associated with the panoramic imaging system or a second sensor associated with the lens and the panoramic imaging system, where the second image correction data is based on an error identified in an individual image acquired by the second lens or the second sensor, where the individual image was acquired with a plurality of pre-determined operating parameters;

where the second logic produces second strip correction data for the second lens or the second sensor, where the second strip correction data is based on an error identified in a strip of images pieced together from a plurality of individual images acquired by the second lens or the second sensor;

where the third logic produces second panoramic image correction data for the second lens or the second sensor, where the second panoramic image correction data is based on an error identified in a panoramic image pieced together from two or more strips of images processed by the second logic; and where the fourth logic stores, in the memory, the second image correction data, the second strip correction data, the second panoramic image correction data, or a combined second correction value computed from the second image correction data, the second strip correction data, and the second panoramic image data, and data that relates the pre-determined operating parameters to the second image correction data, the second strip correction data, the second panoramic image correction data, or the combined second correction value.

* * * * *